W. C. GUILDER.
FARM AND ROAD TRACTOR UNIT.
APPLICATION FILED DEC. 11, 1916.
1,257,999.
Patented Mar. 5, 1918.
3 SHEETS—SHEET 3.
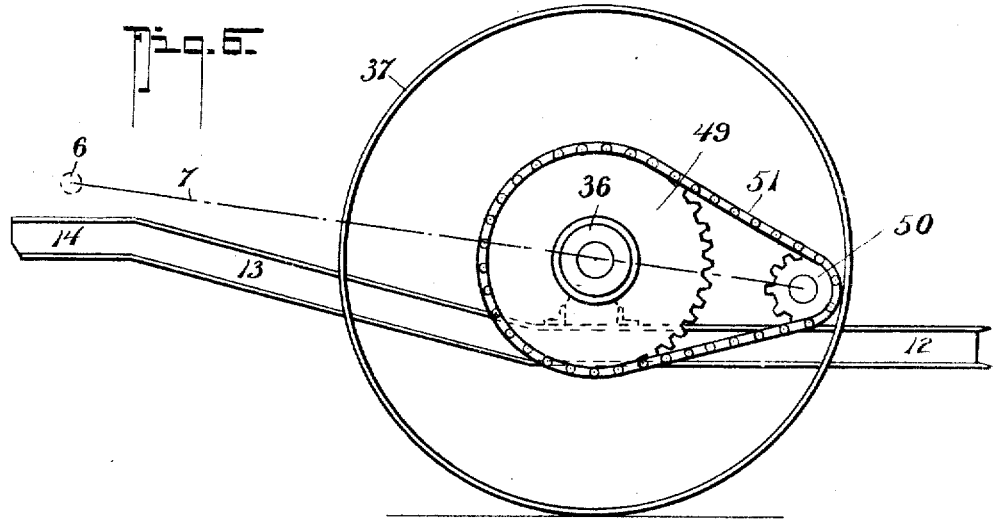
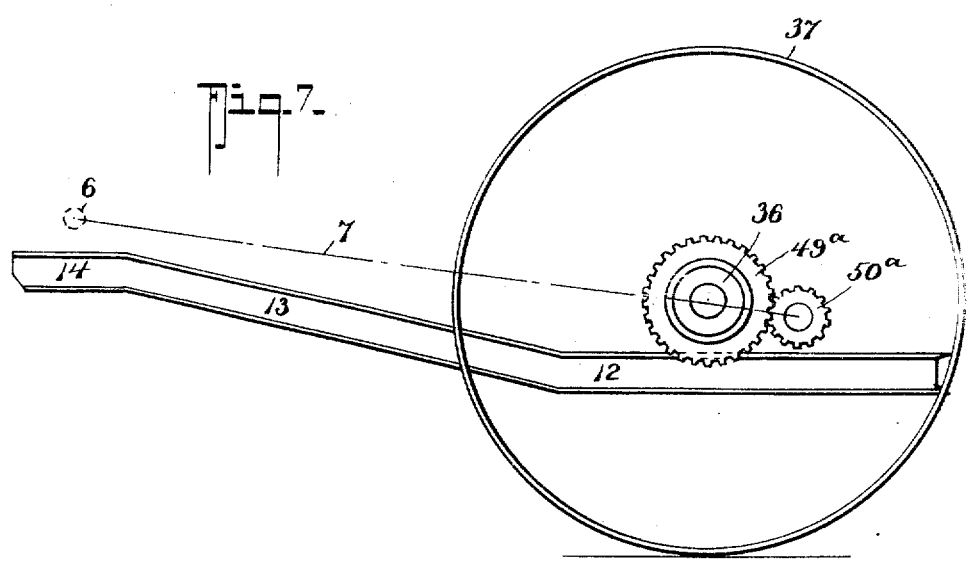
INVENTOR
W. C. Guilder
BY
Fred G. Dieterich & Co
ATTORNEYS.

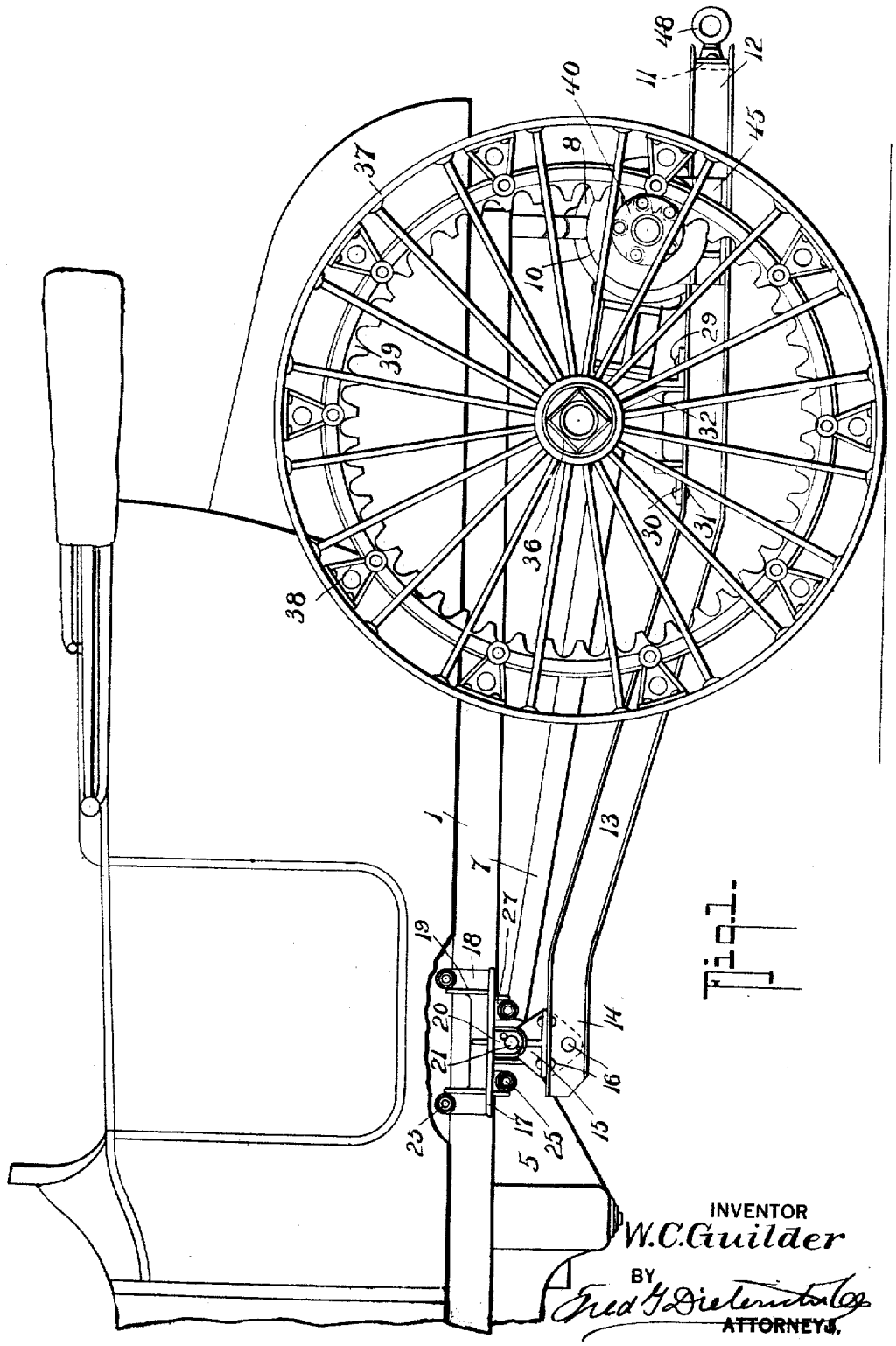

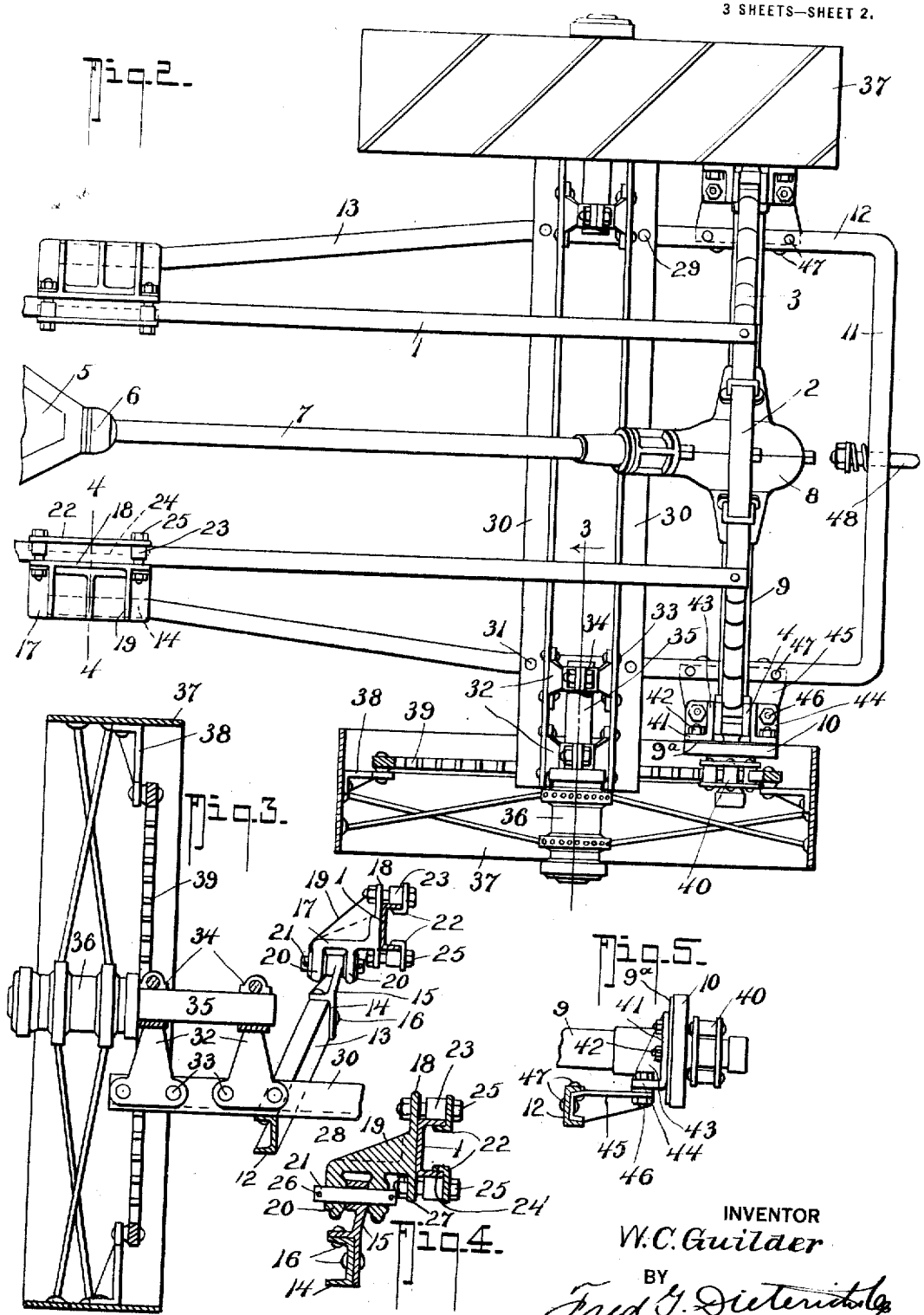

UNITED STATES PATENT OFFICE.

WALTER CLARENCE GUILDER, OF SPRINGFIELD, OHIO, ASSIGNOR TO KNICKERBOCKER MOTORS, INC., OF NEW YORK, N. Y.

FARM AND ROAD TRACTOR UNIT.

1,257,999.         Specification of Letters Patent.         Patented Mar. 5, 1918.

Application filed December 11, 1916. Serial No. 136,278.

*To all whom it may concern:*

Be it known that I, WALTER C. GUILDER, residing at Springfield, in the county of Clark and State of Ohio, have invented certain new and useful Improvements in Farm and Road Tractor Units, of which the following is a specification.

My invention has for one of its principal objects to provide a tractor attachment which may be easily attached to or detached from an ordinary automobile chassis without the necessity of drilling extra holes, removing the rear springs, or otherwise interfering with the normal rear-axle-chassis-spring-construction.

Another object of the invention is to provide a tractor attachment which may be manufactured as a unit structure and which may be driven from the rear axle of the automobile by simply replacing the rear wheels of the automobile with drive gears, or sprockets, depending upon whether the tractor unit is built for gear or chain drive.

A further object of the invention is to provide a tractor attachment of such construction that the draw bar pull strains are received directly by the auxiliary frame and not placed on the auto chassis.

The invention, in order to accomplish the foregoing objects, provides an auxiliary frame, tractor wheels mounted thereon, the auxiliary frame having brackets for effecting a rigid connection with the rear axle housing structure of the automobile, and other brackets for effecting a pivotal connection with the chassis frame, whereby the auxiliary frame will have hinge movement on a transverse axis that passes through the center of the universal joint of the power transmission shaft that operatively connects the power plant with the rear axle of the automobile, thereby allowing the function of the chassis rear springs to remain intact, thus eliminating the use of an extra set of rear springs when the tractor unit is being used.

More in detail, the invention embodies those novel details of construction, combination and arrangement of parts, all of which will be first fully described, then be specifically pointed out in the appended claims, and illustrated in the accompanying drawings, in which:—

Figure 1 is a side elevation of the preferred form of the invention illustrating the same as applied to a well-known make of automobile.

Fig. 2 is a top plan view of so much of the automobile chassis with the invention applied as is necessary to illustrate the same, one of the tractor wheels being shown in section.

Fig. 3 is an enlarged cross section on the line 3—3 of Fig. 2, looking in the direction of the arrow.

Fig. 4 is a detail cross section on the line 4—4 of Fig. 2.

Fig. 5 is a detail elevation showing the bracket connection between the auxiliary frame and the rear axle housing structure of the automobile chassis.

Fig. 6 is a diagrammatic view showing how a roller chain drive may be employed in lieu of the roller gear drive shown in Figs. 1, 2 and 5, of the drawings.

Fig. 7 is another diagrammatic view illustrating a further modification in which the drive is effected by external spur gears.

In the drawings, in which like numerals and letters of reference indicate like parts in all of the figures, 1 represents the chassis frame of the automobile, which includes the rear transverse spring saddle 2 to which the rear spring structure 3 is securely clipped, the rear spring structure 3 being shackle connected at 4 with the rear axle structure 9, the latter including the differential housing 8 and the end flanges 9ª that sustain the usual brake bands to coöperate with the brake flange 10, the brake flange 10 being carried by the wheel structure under normal conditions, or by the drive gear structure 40 when my invention is used.

The attachment, which comprises my present invention, consists of an under-slung frame that is composed of the straight parallel rear side portions 12 connected by the transverse portion 11 and merging with the upwardly extending somewhat converging side arms 13 that terminate in parallel portions 14 to which one section of the front clamp members is secured. The sections 15 of the front clamp members are riveted at 16 to the ends 14 of the under-slung frame and are pin-connected at 21 to the pendent lugs 20 of the upper sections of the clamp bracket. The upper section of each forward clamp bracket consists of a horizontal plate 17, a vertical plate 18 and strengthening ribs 19, and the same is adapted to be secured to the channel iron of the chassis frame by bolts 25 and clamping bars 22, the latter having lugs 23 through which the bolts 25 pass (see especially Figs. 2 and 4). The clamp bars 22 have flanges 24 which project into the channel of the frame bar 1 and are spaced from the lugs 23 a distance sufficient to permit entrance of the flanges of the channel bar 1. The pins 21 are held in place by suitable cotters 26 and the bracket 15 has a bearing 28 that projects between the lugs 20 and is apertured for the passage of pins 21. The plate 18 is also provided with pendent lugs 27 through which additional clamping bolts 25 pass.

30—30 represent a pair of angle irons which are spaced apart and disposed transversely across the auxiliary frame and are secured to the parallel sections 12 of that frame by rivets 29—31, or in other suitable ways. At each end of the cross irons 30—30 there is provided upwardly extending arms 32 which sustain split bearings in which the stub shafts 35 for the tractor wheels 37 are firmly secured by suitable clamp bolts, indicated in Fig. 2. The brackets 32 are riveted at 33 or otherwise secured to the angle irons 30—30.

Each tractor wheel is composed of the usual frame structure that is connected by suitable spokes with the hub 36 that is suitably journaled on the respective stub shaft 35, and 38 designates brackets supported from the frame of the wheel and carrying, in the preferred form, an internal gear 39, which meshes with the roller gear mechanism 40 that is adapted to be secured to the rear axle of the automobile in lieu of the rear wheels of the same which are removed.

The under-slung frame is rigidly secured to the rear axle structure by brackets which comprise separable members, best shown in Figs. 2 and 5, by reference to which it will be observed that there is provided a bracket member composed of the horizontal plate 44 and the vertical plate 41 braced by webs 43 which are spaced apart to fork over the ends of the rear axle housing, the vertical plates 41 being bolted at 42 to the end plate 9ª of the axle housing. A second bracket section 45 is riveted at 47 to the auxiliary frame bar 12 and is bolted at 46 to the horizontal plate 44 of the axle bracket section.

At the front end the under-slung frame is pivotally secured to the chassis frame to swing on a horizontal axis passing through the pins 21 and through the center of the universal joint 6, thus enabling the auxiliary frame to rise and fall with the rear axle structure normally the same as when the automobile was in use, save that the lateral or twisting motions are restrained by the rigid connection of the under-slung frame so as to maintain the driving members 40 in mesh with the gears 39.

Instead of providing an internal gear drive, such as shown in Figs. 1, 2 and 3, an external spur gear drive, such as indicated in Fig. 7, may be employed, and in that event, the tractor wheel 37 is provided with a spur gear 49ª that meshes with a spur gear 50ª which is secured on the end of the rear axle in lieu of the rear wheels of the automobile, or instead of a direct gear drive a roller chain drive may be employed, as indicated in Fig. 6, by reference to which it will be noticed that the tractor wheels 37 are provided with sprockets 49, and sprockets 50 are fitted on the rear ends of the automobile axle, the sprockets 49 and 50 being connected by a suitable chain 51, preferably of the roller type.

It will be noticed that with my arrangement, which has very few parts, a simple and durable tractor unit has been developed which can easily be attached to or detached from an automobile chassis in a very few moments, thereby making a successful universal farm or road tractor and automobile or allowing the automobile to be used as such when the tractor unit has been removed. In order to attach the unit to an automobile, the forward bracket members are clamped to the chassis frame in proper position, where they remain so long as the automobile and tractor attachment are to be used in association, while the upper sections of the rear brackets are secured to the rear axle structure where they also remain relatively permanent. The under-slung frame is next put in place by attaching the lower bracket sections to the upper bracket sections through the instrumentality of the bolts 46 and pins 21. after which the under-slung frame may be jacked up, the rear wheels of the automobile removed, and the drive members 40 put in place thereon. The tractor wheels can then be put on the stub shafts and the machine is ready for operation as a tractor.

In order to detach the machine, it is only necessary to reverse the aforesaid operations.

From the foregoing description, taken in connection with the accompanying drawings, it is thought the complete construction, operation and advantages of my invention will be obvious to those skilled in the art, and I desire it to be understood that while I do not claim to be the inventor of the broad idea of converting a pleasure type of automobile into a tractor, nevertheless the arrangement which I have distinguished from the prior art in the appended claims, I regard as broadly new and capable of certain obvious modifications and rearrangements without departing from the spirit of the invention.

What I claim is:—

1. In a tractor attachment, an auxiliary frame, tractor wheels mounted on said frame in advance of the rear axle structure of the automobile, brackets for effecting connection to the rear axle structure of an automobile, said brackets being located on each side of the rear axle structure of the automobile, other brackets for effecting connection of said auxiliary frame at the front to the chassis frame of the automobile, and a power transmitting connection for said tractor wheels adapted to be mounted on the automobile rear axle in place of the rear wheels which are removed.

2. In combination with an automobile chassis which includes a chassis frame, a rear axle structure, spring suspension between the frame and rear axle structure, a power plant, a drive shaft including a universal joint, between the power plant and the rear axle; of a tractor attachment which comprises an auxiliary frame adapted to be located below the chassis frame, brackets connecting said auxiliary frame to the housing of the rear axle structure, other brackets connecting said auxiliary frame to the chassis frame, traction wheels mounted on said auxiliary frame in advance of said first mentioned brackets, and power-drive-elements adapted to be placed on the rear axles in lieu of the wheels removed and connected with the tractor wheels for driving the same.

3. In combination with an automobile chassis which includes a chassis frame, a rear axle structure, spring suspension between the frame and rear axle structure, a power plant, a drive shaft including a universal joint, between the power plant and the rear axle; of a tractor attachment which comprises an auxiliary frame adapted to be located below the chassis frame and extended under the rear axle, brackets connecting said auxiliary frame to the housing of the rear axle structure, other brackets connecting said auxiliary frame to the chassis frame, traction wheels mounted on said auxiliary frame in advance of said first mentioned brackets, and power-drive-elements adapted to be placed on the rear axles in lieu of the wheels removed and connected with the tractor wheels for driving the same.

4. In combination with an automobile chassis which includes a chassis frame, a rear axle structure, spring suspension between the frame and rear axle structure, a power plant, a drive shaft including a universal joint between the power plant and the rear axle; of a tractor attachment which comprises an auxiliary frame adapted to be located below the chassis frame and extended under the rear axle, brackets connecting said auxiliary frame to the housing of the rear axle structure, other brackets pivotally connecting said auxiliary frame to the chassis frame and power-drive-elements adapted to be placed on the rear axles in lieu of the wheels removed and connected with the tractor wheels for driving the same.

5. In a tractor attachment, the combination with an automobile chassis, of an under-slung auxiliary frame, brackets rigidly connecting the rear of said frame to the rear axle structure of the automobile chassis, bracket clamps on the chassis frame, brackets on the auxiliary frame pivotally connected to said bracket clamps, tractor-wheel-stub-shaft-supporting brackets on the auxiliary frame, stub shafts carried by said last named brackets, tractor wheels on said stub shaft and a power transmitting connection between the rear axle of the automobile and said tractor wheels.

6. In a tractor attachment, the combination with an automobile chassis, of an under-slung auxiliary frame, brackets rigidly connecting the rear of said frame to the rear axle structure, of an automobile chassis, bracket clamps on the chassis frame, brackets on the auxiliary frame pivotally connected to said bracket clamps, the pivotal axis lying so as to pass through the center of the universal joint of the drive shaft connection between the rear axle structure and the power plant of the automobile chassis, tractor-wheel-stub-shaft-supporting brackets on the auxiliary frame, stub shafts carried by said last named brackets, tractor wheels on said stub shaft and a power transmitting connection between the rear axle of the automobile and said tractor wheels.

7. A tractor attachment for an automobile chassis of the type which includes a chassis frame, a rear axle structure, rear spring suspension between the axle and frame, a power plant on the chassis frame, a drive shaft structure between the power plant and rear axle structure which includes a universal joint; said attachment comprising an under-slung frame having side bars connected by a rear bar, rigid bracket elements carried by said under-slung frame by means of which the said frame may be secured to the rear axle structure of the chassis, articulated bracket elements securable to the chassis frame and mounted on the front of said under-slung frame, tractor wheels carried by said under-slung frame, and power transmitting elements for driving the tractor wheels from the rear axle of the automobile to which it is attached.

8. A tractor attachment for an automobile chassis of the type which includes a chassis frame, a rear axle structure, rear spring suspension between the axle and frame, a power plant on the chassis frame, a drive shaft structure between the power plant and the rear axle structure which includes a universal joint; said attachment comprising an under-slung frame having side bars connected by a rear bar, rigid bracket elements carried by said under-slung frame by means of which the said frame may be secured to the rear axle structure of the chassis, said bracket elements each comprising separable members, one for attachment to the rear axle structure and the other fixed to the under-slung frame and a connecting device for securing said elements together, bracket elements securable to the chassis frame and mounted on the front of said under-slung frame, tractor wheels carried by said under-slung frame and power transmitting elements for driving the tractor wheels from the rear axle of the automobile to which it is attached.

9. A tractor attachment for an automobile chassis of the type which includes a chassis frame, a rear axle structure, rear spring suspension between the axle and frame, a power plant on the chassis frame, a drive shaft structure between the power plant and the rear axle structure which includes a universal joint; said attachment comprising an under-slung frame having side bars connected by a rear bar, rigid bracket elements carried by said under-slung frame by means of which the said frame may be secured to the rear axle structure of the chassis, bracket elements securable to the chassis frame and mounted on the front of said under-slung frame, said last named bracket elements each comprising a pair of sections pivoted together, tractor wheels carried by said under-slung frame and power transmitting elements for driving the tractor wheels, from the rear axle of the automobile to which it is attached.

10. A tractor attachment for an automobile chassis of the type which includes a chassis frame, a rear axle structure, rear spring suspension between the axle and frame, a power plant on the chassis frame, a drive shaft structure between the power plant and rear axle structure which includes a universal joint; said attachment comprising an under-slung frame having side bars connected by a rear bar, rigid bracket elements carried by said under-slung frame by means of which the said frame may be secured to the rear axle structure of the chassis, and cross bars secured on said under-slung frame, stub shaft carrying brackets secured to said cross bars, tractor wheels on said stub shafts and power transmitting elements for driving said tractor wheels from the rear axle of the automobile to which it is attached.

11. A tractor attachment for automobiles which comprises an auxiliary frame consisting of rear parallel side sections connected by a rear transverse section, forwardly extending upwardly and inwardly converging sections terminating in parallel front ends, bracket members permanently secured to said front ends and including bearing lugs, clamp brackets having bearing lugs to which said first mentioned bearing lugs are pivotally connected, said clamp bracket being adapted to be secured to an automobile chassis frame, the laterally projecting bracket members secured to the parallel side bars of the under-slung frame near the rear, upwardly extended bracket members secured to said laterally projected bracket members and adapted to be secured to the rear axle structure of an automobile, transverse angle iron secured to said auxiliary frame and projecting laterally beyond the same, stub shaft brackets carried by said cross bar, stub shafts mounted in said brackets, tractor wheels mounted on said stub shafts, and power transmitting elements for operatively connecting said tractor wheels with the rear axle of an automobile to which the attachment is applied.

WALTER CLARENCE GUILDER.